United States Patent
Karube et al.

Patent Number: 5,966,398
Date of Patent: Oct. 12, 1999

[54] BLOWER FOR A GAS LASER

[75] Inventors: Norio Karube, Machida; Yasuyuki Morita, Yokohama; Kenji Nakahara, Fukuoka; Kenji Mitsui, Asaka, all of Japan

[73] Assignee: FANUC Limited, Yamanashi, Japan

[21] Appl. No.: 08/952,786

[22] PCT Filed: Apr. 2, 1997

[86] PCT No.: PCT/JP97/01137

§ 371 Date: Nov. 26, 1997

§ 102(e) Date: Nov. 26, 1997

[87] PCT Pub. No.: WO97/37405

PCT Pub. Date: Oct. 9, 1997

[30] Foreign Application Priority Data

Apr. 2, 1996 [JP] Japan ................................. 8-102053

[51] Int. Cl.[6] .................................................. H01S 3/036
[52] U.S. Cl. ............................................ 372/58; 415/111
[58] Field of Search .............................. 372/58; 415/111, 415/112

[56] References Cited

U.S. PATENT DOCUMENTS

| | | | |
|---|---|---|---|
| 4,545,741 | 10/1985 | Tomioka et al. | 417/365 |
| 5,297,927 | 3/1994 | Aizawa et al. | 415/110 |
| 5,461,636 | 10/1995 | Karube et al. | 372/58 |
| 5,555,956 | 9/1996 | Voss et al. | 415/111 |
| 5,865,597 | 2/1999 | Ozawa | 415/109 |

FOREIGN PATENT DOCUMENTS

| | | |
|---|---|---|
| 2-1193 | 1/1990 | Japan . |
| 7-211962 | 8/1995 | Japan . |

*Primary Examiner*—James W. Davie
*Attorney, Agent, or Firm*—Staas & Halsey

[57] ABSTRACT

In a gas laser blower, the lower end opening of the oil passage (14) extends below the liquid level of the oil reservoir (17), so that the internal chamber (18) of housing and the oil passage (14) are separated by the oil within the oil reservoir. Further, a cylindrical guard (24) is disposed around the lower bearing (6) which supports the shaft so that the oil and oil mist scattered from the bearing are caught by the guard (24) and is returned to the oil reservoir.

9 Claims, 4 Drawing Sheets

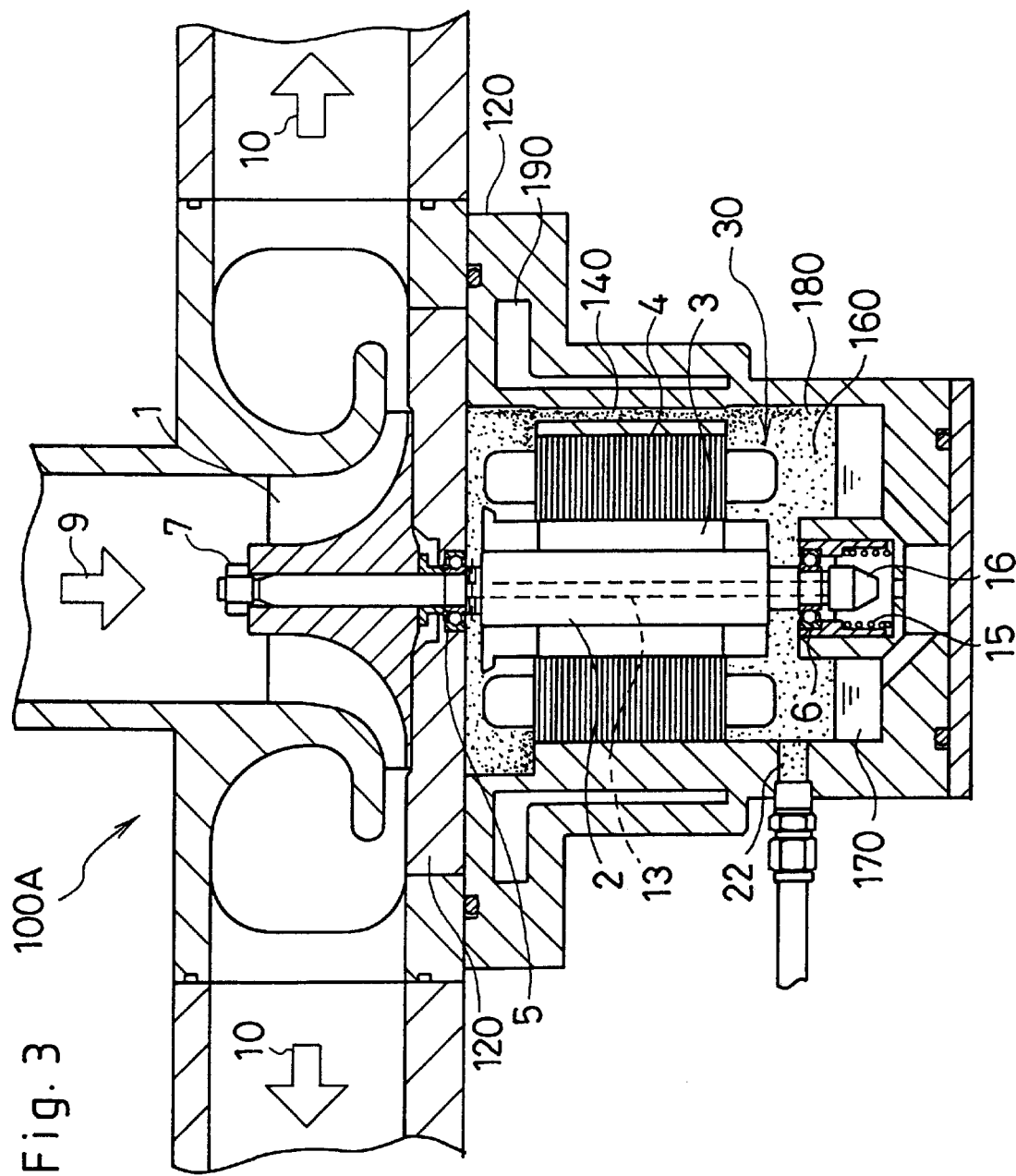

BLOWER FOR A GAS LASER

BACKGROUND OF THE INVENTION

1. Field of the Invention

The present invention relates to a gas laser blower which forcibly circulates a laser gas in a processing gas laser apparatus and the like.

2. Prior Art

Recent high-speed axial flow type carbonic acid gas laser apparatuses (a $CO_2$ gas laser oscillation apparatuses) not only can provide a high output while it is compact but also can generate a high quality laser beam, so that they are becoming widely used for a laser processing such as cutting of metallic or non-metallic materials, welding of metallic materials and the like. Particularly, their applications are increasing rapidly in the field requiring a material to be cut to a complicated shape at a high speed and a high accuracy in the form of CNC laser processing machines which is connected to, a CNC computerized numerical control apparatuses.

In the carbonic acid gas laser apparatus, about 20 percent of electric energy inputted is converted into a laser beam and the remainder thereof is consumed in heating a laser gas. Theoretically, a laser oscillation gain is in proportion to $-(3/2)$ power of an absolute temperature T. Accordingly, in order to raise the oscillation efficiency, it is necessary to forcibly cool the laser gas so as to lower the temperature of the laser gas as much as possible. Thus, in the case of a carbonic acid gas laser apparatus of a high-speed axial flow type, a turbo blower for a gas laser and the like are employed for forcing the laser gas into the cooling device by forced circulation of the laser gas within the apparatus.

An example of a conventional turbo blower for a gas laser is shown in FIG. 3. In FIG. 3, a turbo vane 1 of a turbo blower 100A for a gas laser is connected to an upper end of a shaft 2 by a nut 7. A rotor 3 is fixed to the shaft 2 along the outer periphery thereof by a shrinkage fit. A stator 4 is provided outside the rotor 3. The stator 4 is fixed to a housing 120 and constitutes a high frequency motor 30 with the rotor 3. The shaft 2 and the turbo vane connected thereto are rotated at a high speed of tens of thousands RPM by this high frequency motor 30.

An upper portion of the shaft 2, that is, a portion of shaft between an upper end of the rotor 3, constituting the high frequency motor 30, and an upper end of the turbo vane 1, which are respectively mounted on the shaft 2, is supported by a ball bearing 5 mounted on an upper portion of the housing 120, and a lower portion of the shaft 2 is supported by a ball bearing 6 mounted on a shaft supporting portion formed in a lower portion of the housing 120, respectively.

Oil in an oil reservoir 170 is supplied to the ball bearings 5 and 6 by a pump 16 which utilizes a centrifugal force to lubricate these ball bearings 5 and 6. Then, the oil supplied to the ball bearings 5 and 6 is returned to the oil reservoir 170 after passing through an oil passage 140 and an internal chamber of the housing 180. The oil is cooled by cooling water which flows in a cooling water passage 190 provided along the oil passage 140 when the oil passes through the oil passage 140. By this cooling, the oil gives off its heat absorbed while lubricating the ball bearings 5 and 6.

In this way, the oil is repetively heated and cooled as it circulates during operation of the turbo blower 100A for the gas laser, so that a large amount of oil and oil mist 160 exist within the housing 120.

In order to prevent the oil and oil mist 160 from passing the interior of the housing 120 to enter the carbonic acid gas laser apparatus, it is structured that a vacuum pump (not shown) discharges the laser gas from the internal chamber 180 of a housing through a vacuum discharge port 22 so as to always keep the pressure in the internal chamber 180 of housing lower than that within the turbo vane chamber.

In the above structure, the oil, particularly the oil which lubricated the upper bearing 5, scatters into mist while returning to the oil reservoir passing through the oil passage 140 and to the internal chamber 180 of housing, thereby floating in the internal chamber 180 of housing. Thus, when the gas within the internal chamber 180 of housing is discharged through the vacuum discharge port 22 by the vacuum pump, the floating oil mist is discharged together with the laser gas so that a considerable amount of oil is lost during a long period of time.

SUMMARY OF THE INVENTION

An object of the present invention is to provide a blower for a gas laser which is capable of preventing an oil in a blower from being consumed for a short period of time due to discharge of oil and oil mist by a vacuum pump together with a laser gas.

The blower for gas laser according to the present invention comprises a blower housing forming an internal chamber having a vacuum discharge port, an oil passage so formed as to extend through a side wall constituting the housing, an upper bearing and a lower bearing respectively mounted on an upper portion and a lower portion of the housing, a shaft supporting a vane at an upper end thereof and a pump at a lower end thereof respectively and supported by the upper bearing and the lower bearing respectively, and an oil reservoir formed at the bottom of the housing, wherein the oil within the oil reservoir is supplied to the lower bearing and the upper bearing by the operating of the pump, and the oil is passed through the oil passage to be returned to the oil reservoir. Further, in accordance with the present invention, in the above blower for the gas laser, the lower end of the oil passage is constructed to open inside the wall of the housing which forms the oil reservoir, making the internal chamber and the oil passage to be separated by the oil within the oil reservoir.

Still further, a cylindrical member may be disposed within the housing so as to surround the lower bearing in concentric relationship with the shaft, and a lower portion of the cylindrical member may be positioned in the oil reservoir, thereby catching the oil and the oil mist scattered from the lower bearing by the cylindrical member so as to return all of them to the oil reservoir.

With the above structure according to the present invention, oil and oil mist do not enter the internal chamber of housing, so that oil consumption when a laser gas is discharged can be reduced largely.

BRIEF DESCRIPTION OF THE DRAWINGS

FIG. 3 is a cross sectional view of an example of a conventional turbo blower for a laser;

DESCRIPTION OF THE PREFERRED EMBODIMENTS

First, the entire structure of a carbonic acid gas laser apparatus to which a laser turbo blower according to the present invention is applied will be explained below with reference to FIG. 2.

Figure 2:
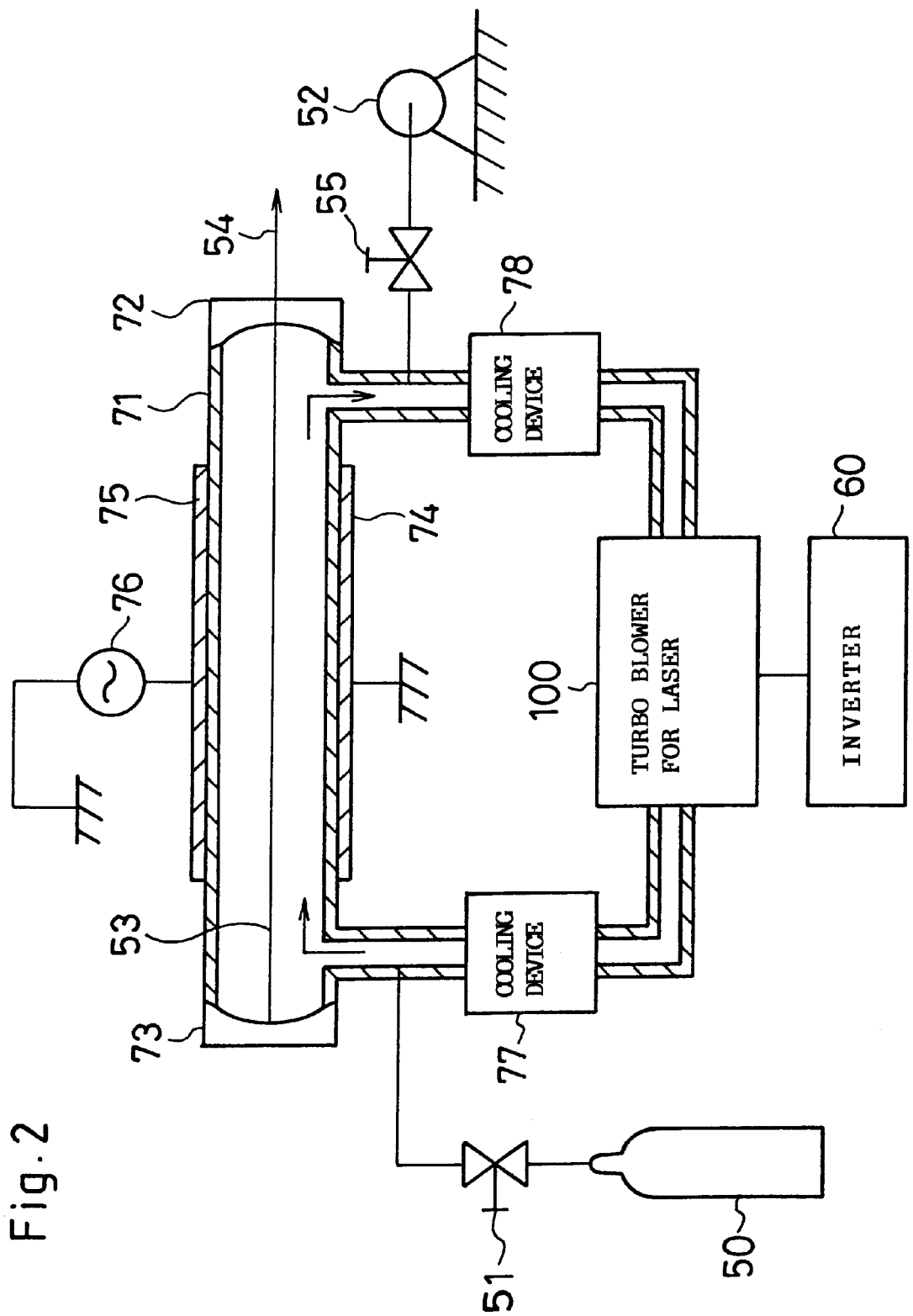
FIG. 2 shows the entire structure of a carbonic acid gas laser apparatus to which the turbo blower of FIG. 1 is applied.

In FIG. 2, on both ends of a discharge tube 71, an optical resonator comprising an output coupling mirror 72 and a total reflection mirror 73 are placed. Metal electrodes 74 and 75 are mounted on the outer periphery of the discharge tube 71. The metal electrode 74 is grounded and the metal electrode 75 is connected to a high frequency power supply 76. A high frequency voltage is applied across the metal electrodes 74 and 75 from the high frequency power supply 76, whereby a high frequency glow discharge is generated within the discharge tube 71 to give rise to a laser excitation. A laser beam 53 is generated within the discharge tube 71 by the laser excitation, and part of this laser beam becomes a laser beam 54 discharged through the output coupling mirror 72.

When this gas laser oscillating apparatus is started, a valve 55 is first opened so that all the gas within the apparatus is discharged by a vacuum pump 52. Next, a flow rate adjusting valve 51 is opened to introduce a laser gas from a gas bomb 50 until a predetermined gas pressure is obtained. Thereafter, the valve 55 is throttled to control exhaust of the vacuum pump 52 and the amount of the gas supply through the valve 51 is controlled so that a part of the laser gas is continuously replaced with a fresh gas while keeping the gas pressure within the apparatus at a predetermined value and preventing contamination of the gas within the apparatus.

Further, the laser gas is circulated within the apparatus by a turbo blower 100 for a laser, which serves as a ventilator. The purpose of the circulation is to cool the laser gas. In a $CO_2$ gas laser, about 20 percent of the electric energy inputted is converted into a laser beam and the remainder is consumed to heat the gas. However, since a laser oscillation gain is theoretically in proportion to $-(3/2)$ power of an absolute temperature T, in order to improve the oscillation efficiency, it is necessary for the laser gas to undergo forced-cooling.

In this apparatus, the laser gas flows toward a direction shown by the arrow after passing through the discharge tube 71 at a flow rate of about 200 m/sec or more so as to be introduced into a cooling device 78. The cooling device 78 mainly removes the heating energy generated by discharge. Further, the laser turbo blower 100 compresses the cooled laser gas. The compressed laser gas is introduced into the discharge tube 71 through a cooling device 77. This process is for removing the heat of compression of the laser gas by the cooling device 77 before the laser gas compressed by the turbo blower 100 is reintroduced into the discharge tube 71. Since these cooling devices 77 and 78 are well known, the detailed explanation thereof is omitted herein.

The laser turbo blower 100 is driven by an inverter 60. Since the laser turbo blower 100 rotates at a high speed of tens of thousands RPM, for the inverter 60, a high frequency inverter that match the rotational speed of the blower 100 is employed.

Next, the structure of the laser turbo blower according to one embodiment of the present invention will be described with reference to FIG. 1.

Figure 1:
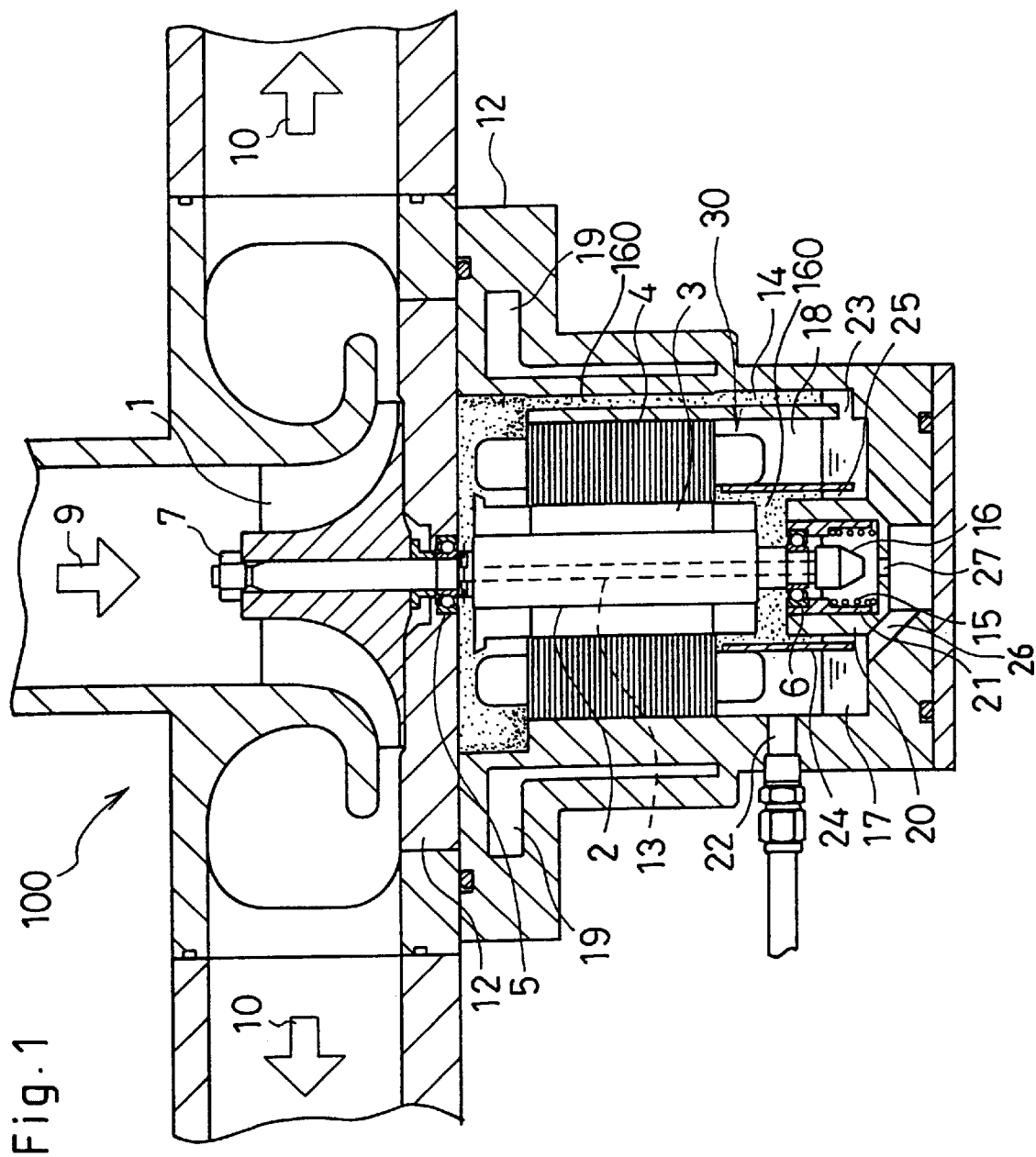
FIG. 1 is a cross sectional view a turbo blower for a laser according to an embodiment of the present invention.

As shown in FIG. 1, the turbo vane 1 for the gas laser turbo blower 100 is connected to an upper end of the shaft 2 by the nut 7. The rotor 3 is fixed to the shaft 2 along the outer periphery thereof by a shrinkage fit. The stator 4 is provided outside the rotor 3. The stator 4 is fixed to a housing 12 and constitutes the high frequency motor 30 together with the rotor 3.

An upper portion of the shaft 2, that is, a shaft portion between an upper end of the rotor 3 constituting the high frequency motor 30 and an upper end of the turbo vane 1 which are mounted on the shaft 2, is supported by a ball bearing 5 mounted on an upper portion of the housing 12, while a lower portion of the shaft 2 is supported by a ball bearing 6 mounted on a shaft supporting portion 20 formed at a lower portion of the housing 12, respectively.

The laser gas is drawn from the cooling device 78 (FIG. 2) into the turbo blower 100 in a manner as shown by the arrow 9 and discharged from the turbo blower 100 as it is separated into two parts as shown by the arrow 10 so as to be discharged toward a centrifugal direction. The laser gas discharged from the cooling device 78 toward the two directions flows into a plurality of discharge tubes 71 after passing through one or a plurality of cooling devices 77. Further, the laser gas, after passing through the discharge tube 71, passes through one or a plurality of cooling devices 78, and finally returns to a single passage as shown by the arrow 9 so as to flow into the turbo blower 100 (in FIG. 2, the system is shown in a simplified form).

A bearing sleeve 21 is provided on the inner peripheral surface of the shaft supporting portion 20 around the ball bearing 6. A spring 15 is disposed below the bearing sleeve 21 to apply a pre-load to the ball bearings 5 and 6 so that both the bearings 5 and 6 support the whole body of the shaft 2 which is held vertical.

An oil reservoir 17 and a internal chamber 18 of the housing are formed at the lower end of the shaft 2 and just under the motor 30 in the housing 12. An oil pump 16 which is mounted to a lower free end of the shaft 2 is disposed within the oil reservoir 17. Further, an oil passage 26 which is formed within the housing communicates with a bottom portion of the oil reservoir 17. Then, the oil within the oil reservoir 17, after passing through the oil passage 26, passes through a through port 27, opening in the center of the bottom of the shaft supporting portion 20, to enter the cylindrical inner portion of the shaft supporting portion 20 and the oil pump 16. That is, the oil reservoir 17 and the cylindrical inner portion of the shaft supporting portion 20 communicate with each other through the oil passage 26 and the through port 27, the oil within the oil reservoir 17 and the oil within the shaft supporting portion 20 are kept at the same level.

On the other hand, during the rotation of the shaft 2, the oil pump 16 supplies the oil not only to the ball bearing 6 disposed below but also to the ball bearing 5 disposed above through an oil passage 13 disposed at the center of the shaft 2 by the pumping effect at its outer periphery. The structure of the oil pump 16 is well known from Japanese Unexamined Patent Publication No. 1-153897, and etc. Further, the vacuum discharge port 22 is formed in the internal chamber 18 housing and the laser gas within the internal chamber 18 is discharged through the vacuum discharge port 22 by the vacuum pump (not shown), thereby always keeping the pressure in the internal chamber 18 of housing lower than the pressure within the turbo vane chamber.

Within the portion of the wall forming the housing 12 which opposes the outer periphery of the stator 4 constituting the motor 30, there is formed an oil passage 14 along the stator 4, and further, in the outer periphery thereof, a cooling water passage 19 is formed along the oil passage 14. The oil is fed by the oil pump 16 from the oil reservoir 17 to the vicinity of the ball bearings 5 and 6 through the oil passage 26 as the shaft 2 rotates, and a part of the oil which is used for lubricating the bearing 5 is returned to the oil reservoir 17 after being cooled in the oil passage 14, thereby keeping oil always circulating during the operation of the laser turbo blower 100.

In the laser turbo blower 100 having the above-described structure, the oil passage 14 extends below the liquid level of a reserved oil within the oil reservoir 17 to directly communicate with the oil reservoir 17, thereby enabling the oil to circulate through the oil passages 23 and 26. Thus, the internal chamber 18 of housing having the vacuum discharge port 22 and the oil passage 14 are separated by the reserved oil within the oil reservoir 17, thereby preventing oil and oil mist in the oil passage 14 from entering the internal chamber 18 of housing and the vacuum discharge port 22.

Further, a portion or whole of the oil passage 14 may be formed tubular, and a lower opening of the tubular, portion of the oil passage 14 may extend below the liquid level of the oil reservoir 17.

Figure 4A:
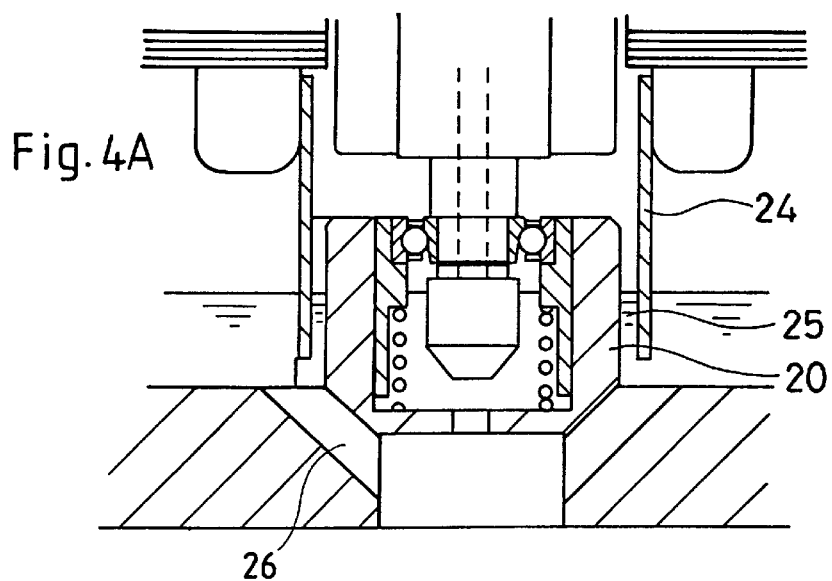
FIG. 4A is a vertical sectional view of a lower end portion of a shaft of the turbo blower shown in FIG. 1.
Figure 4B:
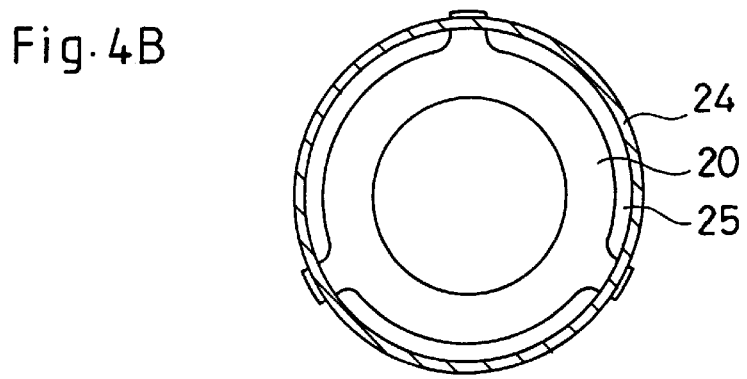
FIG. 4B is a horizontal sectional view of the lower end portion of the shaft of the turbo blower shown in FIG. 1.

Still further, as shown in FIGS. 1, 4A and 4B, a cylindrical guard 24 is disposed around the outer periphery of the shaft supporting portion 20 in such a manner that the axis thereof coincides with the axis of the shaft 2, thereby catching the oil and the oil mist scattered from the lower ball bearing 6. As shown in FIG. 4A, the lower end of the guard 24 extends into the oil reservoir 17. The oil and oil mist thus caught are gradually returned to the oil reservoir 17 through an oil passage 25 formed between the guard 24 and the shaft supporting portion 20. Since the interior of the cylindrical guard 24 and the internal chamber 18 of housing are separated from each other by the oil within the oil reservoir 17, the floating oil mist within the cylindrical guard 24 will not move into the internal chamber 18 of housing. Therefore, the presence of this guard 24 prevents oil and oil mist from scattering into the internal chamber 18 housing.

Figure 5:
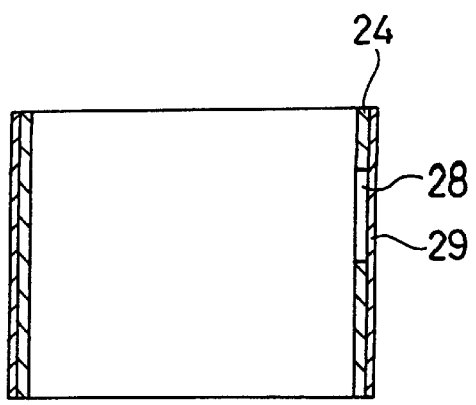
FIG. 5 is a vertical sectional view of a guard different in form from that shown in FIGS. 4A and 4B.

Furthermore, the cylindrical guard 24 is preferably transparent, but, when it is opaque, a viewing window 28 may be provided on the side surface thereof so as to confirm from outside the direction of rotation of the rotating body, and a transparent cover 29 may be attached thereto as shown in FIG. 5. In the instant embodiment, a gas impermeable material is employed for the guard 24, but the same effect can be obtained by using an oil mist filter.

Thus, the amount of oil consumption resulting from the laser gas discharge performed for replenishing of fresh laser gas and for preventing contamination of the optical parts can be reduced largely so that the reliability and maintainability of the laser turbo blower 100 can be improved. Further, since the amount of oil contained in the discharged laser gas is reduced, the reliability of a discharge gas controller, a vacuum pump and the like within the carbonic acid gas laser apparatus can also be improved.

In the above embodiment, the turbo vane 1 for the laser turbo blower 100 is of centrifugal type but it may be replaced with a diagonal flow vane or an axial flow vane or the like.

What is claimed is:

1. A gas laser blower comprising:

a blower housing forming an internal chamber having a vacuum discharge port, an oil passage formed so as to extend within a side wall forming the blower housing, an upper bearing and a lower bearing respectively mounted on an upper portion and a lower portion of said blower housing, a shaft mounted with a vane at an upper end thereof and a pump at a lower end thereof respectively and supported by said upper bearing and said lower bearing, and an oil reservoir formed at the bottom of the housing, in which oil within said oil reservoir is supplied to the lower bearing and to the lower portion of the upper bearing by operating said pump, the oil is passed through said oil passage and then returned to said oil reservoir, wherein the oil passage is formed such that the lower end thereof is positioned at the inner wall of a housing which forms an oil reservoir and also opens onto the interior of the housing at a level below the oil level so that said internal chamber and said oil passage are separated by the oil within said oil reservoir.

2. A gas laser blower according to claim 1, wherein a portion or whole of said oil passage is formed tubular and a lower end opening of the tubeular portion of the oil passage extends below the level of the oil in the oil reservoir.

3. A gas laser blower according to claim 1, wherein a cylindrical member, which is concentric with said shaft and placed surrounding said upper and lower bearings, is disposed within said housing so that an oil mist produced as a result of centrifugal scattering of the oil supplied to said lower bearing due to the rotation of said shaft is caught by said cylindrical member.

4. A gas laser blower according to claim 3, wherein said cylindrical member is disposed in such a manner that a lower portion thereof extends below the level of the liquid in said oil reservoir so that the oil and oil mist scattering from said lower bearing are caught by said cylindrical member and returned entirely to the oil reservoir.

5. A gas laser blower according to claim 3 wherein said cylindrical member is made of a transparent material which inhibits the permeation of the oil and the oil mist therethrough.

6. A gas laser blower according to claim 3 wherein said cylindrical member is made of a filter which inhibits the permeation of the oil and the oil mist therethrough.

7. A gas laser blower according to in claim 3 wherein said cylindrical member is made of an opaque material and is provided with a viewing window located in a side surface thereof for watching the interior thereof and with cover for sealing the viewing window.

8. A gas laser bower as recited in claim 3 wherein said cover is made of a transparent material.

9. A blower for a gas laser, said blower comprising:

a blower housing that forms an internal chamber;

an oil passage that extends within a side wall of said internal chamber; and a cylindrical member, concentric with a shaft of said blower, disposed within the housing so that an oil mist produced as a result of centrifugal scattering of oil caused by rotation of said shaft is caught by said cylindrical member and returned to an oil storage reservoir.

* * * * *